United States Patent Office 3,519,713
Patented July 7, 1970

3,519,713
INSECT CHEMOSTERILIZATION EMPLOYING 2,2' - IMINO - DIETHYL - BENZENE SUBSTITUTED BORONATES
George F. Ludvik, Kirkwood, Mo., assignor to Monsanto Company, St. Louis, Mo., a corporation of Delaware
No Drawing. Filed Nov. 21, 1966, Ser. No. 597,504
Int. Cl. A01n 9/00, 23/00
U.S. Cl. 424—185                                11 Claims

ABSTRACT OF THE DISCLOSURE

Insects are controlled by applying to the insects a steriling amount of a compound of the formula

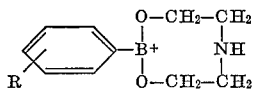

wherein R is alkyl of not more than 4 carbons.

---

This invention relates to chemosterilant compositions and to methods for the control or eradication of insect populations.

The term "insect" is used herein in its broad common usage to include spiders, mites, ticks and like pests which are not in the strict biological sense classed as insects. Thus, the usage herein conforms to the definitions provided by Congress in Public Law 104, the "Federal Insecticide, Fungicide, and Rodenticide Act" of 1947, section 2, subsection $h$, wherein the term "insect" is used to refer not only to those small invertebrate animals belonging mostly to the class Insecta, comprising six-legged usually winged forms, as beetles, bugs, bees, flies, and so forth, but also to other allied classes of arthropods whose members are wingless and usually have more than six legs, as spiders, mites, ticks, centipedes, and wood lice.

In accordance with this invention it has been found that insects can be controlled or eradicated by a method which comprises exposing the insect to a sterlizing amount of a compound of the formula

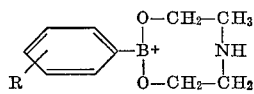

wherein R is alkyl of not more than 4 carbon atoms.

In the above formula R can be methyl, ethyl, n-propyl, isopropyl, n-butyl, sec-butyl, isobutyl or tert-butyl.

For the sake of brevity, the compounds of the above formula which are useful in the compositions and methods of this invention are referred to hereinafter as "chemosterilants."

In carrying out the methods of this invention, the chemosterilants, admixtures thereof or compositions containing them are applied to the insects or to their environment in an amount sufficient to exert a sterilizing action. The chemosterilant compositions of this invention generally contain from about 0.001% to about 99.99% by weight of chemosterilant. The lower concentrations of chemosterilant are particularly effective when the compositions are liquid, but it is preferred to use higher concentrations of chemosterilant when the compositions are semi-solid or solid. Compositions comprising from about .0001% to about 5% by weight of chemosterilant are preferred with those comprising from about 0.001% to about 2% by weight being particularly advantageous. A wide variety of insects, for example, house flies (*Musca domestica*), screw-worm fllies (*Cochliomyia hominivorax*), Mexican fruit flies (*Anastrepha ludens*), oriental fruit fly, vinegar flies, eye gnats, stable flies, mosquitoes, boll weevils, pomace flies (*Drosophila melangaster*), Mediterranean fruit flies, cotton bollworm, codling moth, plum curculio, and the like, can be controlled or eradicated in accordance with the methods of this invention.

Representative chemosterilants which can be used in the compositions and methods of this invention include the following:

2,2'-iminodiethyl-p-methylbenzeneboronate
2,2'-iminodiethyl-p-t-butylbenzeneboronate
2,2'-iminodiethyl-m-methylbenzeneboronate
2,2'-iminodiethyl-m-ethylbenzeneboronate
2,2'-iminodiethyl-o-methylbenzeneboronate The following examples will illustrate the invention.

EXAMPLE 1

2,2' - iminodiethyl-p-methylbenzeneboronate is tested against the house fly using the following procedure:

Adult flies are fed various concentrations of 2,2'-iminodiethyl-p-methylbenzeneboronate on granulated sugar and on regular fly food. The regular fly food consists of 6 parts sugar, 6 parts powdered non-fat dry milk and one part powdered egg yolk. Chemosterilant food compositions are prepared by separately adding 6 ml. of a solution or suspension of 2,2'-iminodiethyl-p-methylbenzeneboronate in a volatile solvent to 10 gms. each of the regular fly food and sugar. The sugar and regular fly food chemosterilant food compositions are allowed to dry, repulverized and replaced in emergence cages which contain 100 newly emerged adult flies. Cages containing untreated regular fly food and sugar are used as controls. All cages are supplied with ample water. After three days the flies are examined and the mortality rate, if any, is noted. At the same time, a dish containing untreated regular fly food consisting of 6 parts sugar, 6 parts powdered non-fat dry milk and one part powdered egg yolk is added to the cages of the flies which are on the sugar diet. When the flies are 6 to 7 days old, one-half inch of moist Chemical Specialties Manufacturers Association medium in a soufflé cup is placed in each cage for oviposition. A few hours later each soufflé cup is removed, filled with water and stirred to separate the egg masses into individual eggs. The eggs from all egg masses are masses are mixed thoroughly and a random sample of 100 eggs from each cage is placed on a small piece of wet black cloth. The black cloth is then placed on moist larval medium in a rearing container. If no eggs are laid, oviposition medium is offered again at intervals of one or two days until it has been offered five times or the flies have oviposited. Three days after oviposition the eggs are examined and the percentage hatched is determined. The larvae that hatch crawl from the cloth into the rearing medium. About 7 days after oviposition the number of pupae are counted to determine the number of larvae that reach the pupal stage of development. Results and further details are given in Table I below:

TABLE I

Chemosterilant activity of 2,2'-iminodiethyl-p-methylbenzeneboronate against the house fly at various concentrations in fly food and sugar

| Food | Concentration, wt. percent | Treated diet | | | Untreated diet | |
|---|---|---|---|---|---|---|
| | | Mortality [1] | Egg Hatch [1] | Pupae [2] | Egg Hatch [1] | Pupae [2] |
| Fly food | 1.0 | 0 | 0 | 0 | 95 | 79 |
| Do | 0.5 | 0 | 0 | 0 | 97 | 95 |
| Do | 0.25 | 0 | 0 | 0 | 97 | 95 |
| Do | 0.1 | 0 | 52 | 48 | 92 | 79 |
| Sugar | 1.0 | 0 | 9 | 8 | 97 | 88 |

[1] Expressed as percent.   [2] Actual number.

EXAMPLE 2

2,2 - iminodiethyl - p-methylbenzeneboronate is tested against the screw-worm fly using the following procedure:
Tests are made with adult fllies less than 24 hours old.

The flies are fed a freshly prepared quantity of sugar syrup containing the chemosterilant for 5 days. After the fifth day, ample quantities of meat, untreated honey and water are provided so that the flies can feed freely. On the eighth day following oral application of the chemosterilant, the females are given the opportunity to lay eggs which are subsequently observed for hatching. The chemosterilants are rated on the basis of no oviposition or failure of eggs to hatch. At 1.0% concentration oviposition is normal but no eggs hatch.

In carrying out the methods of this invention, the chemosterilants can be used alone or in combination with an adjuvant in liquid, solid or gaseous form. The chemosterilant compositions of this invention are prepared by admixing the chemosterilant with an adjuvant including diluents, extenders, carriers and conditioning agents to provide compositions in the form of finely-divided particulate solids, semi-solids, aerosols, solutions and dispersions or emulsions. Thus the chemosterilant can be used with an adjuvant such as a finely-divided particulate solid, a liquid of organic origin, water, a wetting agent, dispersing agent, an emulsifying agent or any suitable combination of these.

Typical finely-divided solid carriers and extenders which can be used in the chemosterilant compositions of this invention include for example, the talcs, clays, pumice, silica, diatomaceous earth, quartz, fuller's earth, salt, sulfur, powdered cork, powdered wood, walnut flour, chalk, tobacco dust, volcanic ash, cottonseed hulls, wheat flour, soybean flour, tripoli, ground corn cobs, charcoals and the like. Typical liquid diluents include for example, kerosene, Stoddard solvent, hexane, benzene, toluene, water, acetone, ethylene dichloride, xylene, alcohols, diesel oil, glycols and the like. Typical liquified gasses for aerosols include for example, haloalkyls such as dichlorodifluoromethane, fluorotrichloromethane, and the like. Typical semi-solid extenders include for example, soap, petroleum jelly, and the like.

The chemosterilants also can be employed in conjunction with attractants for the particular insect being controlled. For example, they can be applied to or admixed with attractants or baits such as sucrose, glucose, molasses, protein mixtures, powdered egg yolk, powdered milk, yellow corn grits, quincy granules, pumice granules, sex attractants, and the like.

The chemosterilant compositions of this invention, particularly liquids and wettable particles, usually contain as a conditioning agent one or more surface active agents in amounts sufficient to render a given composition readily dispersible in water or in oil. By the term "surface-active agent" it is understood that wetting agents, dispersing agents, suspending agents and emulsifying agents are included therein.

The term "chemosterilant composition" as used herein and in the appended claims includes not only compositions in a suitable form for application but also concentrated compositions which require dilution or extension with a suitable quantity of liquid or solid adjuvant prior to application.

Surface-active agents which can be used in the chemosterilant compositions of this invention are set out, for example, in Searle U.S. Pat. 2,426,417, Todd U.S. 2,655,447, Jones U.S. Pat. 2,412,510 and Lenher U.S. Pat. 2,139,276. A detailed list of such agents is also set forth by J. W. McCutcheon in "Soap and Chemical Specialities," November 1947, page 8011 et seq., entitled "Synthetic Detergents"; "Detergents and Emulsifiers—Up to Date" (1960), by J. W. McCutcheon, Inc., and Bulletin E–607 of the Bureau of Entomology and Plant Quarantine of the U.S.D.A. In general, less than about 50 parts by weight of the surface active agent is present per 100 parts by weight of chemosterilant composition.

The preferred chemosterilant compositions are the wettable powders, dusts, aqueous suspensions or solutions, hydrocarbon solutions and emulsifiable oils.

Wettable powders are water-dispersible compositions containing one or more chemosterilants, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols and polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of chemosterilant, from about 0.25 to about 25 parts of wetting agent, from about 0.25 to about 25 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Dusts are dense finely divided particulate compositions which are intended for application in dry form. Dusts are characterized by their free-flowing and rapid settling properties so that they are not readily wind-borne to areas where they are of no value. Dusts contain primarily a chemosterilant and a dense, free-flowing, finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for phytotoxic dusts include micaceous talcs, pyrophyllite, dense kaolin clays, ground calcium phosphate rock and tobacco dust.

The wettable powders described above can also be used in the preparation of dusts. While such wettable powders can be used directly in dust form, it is more advantageous to dilute them by blending with the dense dust diluent. In this manner, dispersing agents, corrosion inhibitors and anti-foam agents may also be found as components of a dust.

Emulsifiable oils are usually solutions of chemosterilant in water-immiscible or partially water-immiscible solvents together with a surfactant. Suitable solvents for the active ingredient of this invention include hydrocarbons and certain water-immiscible ethers, esters or ketones. Suitable surfactants are anionic, cationic and non-ionic such as alkylaryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surfactant and about 4 to 94 parts solvent, all parts being by weight based on the total weight of emulsifiable oil.

Although the invention is described with respect to specific modifications, the details thereof are not to be construed as limitations.

The embodiments of the invention in which an exclusive property or privilege is claimed are defined as follows:

1. A method of controlling flies which comprises applying to the flies a sterilizing amount of a compound of the formula

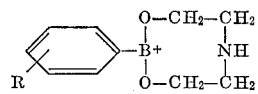

wherein R is alkyl of 1 to 4 carbon atoms.

2. Method of claim 1 wherein R is methyl.
3. Method of claim 1 wherein R is ethyl.
4. Method of claim 1 wherein R is butyl.
5. Method of claim 1 wherein the compound is 2,2'-iminodiethyl-p-methylbenzeneboronate.
6. A chemosterilant composition for flies comprising an inert solid extender, a surface active agent, and a sterilizing amount of a compound of the formula

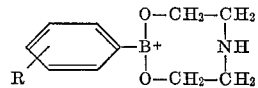

wherein R is alkyl of 1 to 4 carbon atoms.

7. Composition of claim 6 wherein R is methyl.
8. Composition of claim 6 wherein R is ethyl.
9. Composition of claim 6 wherein the compound is 2,2'-iminodiethyl-p-methylbenzeneboronate.
10. A chemosterilant composition for flies comprising an insect bait and a sterilizing amount of a compound of the formula

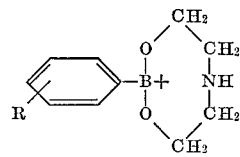

wherein R is alkyl of 1 to 4 carbon atoms.

11. A chemosterilant composition of claim 10 wherein the compound is 2,2'-iminodiethyl-p-methylbenzeneboronate.

References Cited

UNITED STATES PATENTS 3,256,310   6/1966   Weil _____ 424—185

OTHER REFERENCES

Borkovec, Alexe J.: "Insect Chemosterilants," vol. VII (1966), Interscience Pub., pp. 61–63.

Chemical Abstracts: "Formula Index," January–June 1966, p. 337F.

ALBERT T. MEYERS, Primary Examiner

V. D. TURNER, Assistant Examiner